United States Patent [19]

Keys

[11] Patent Number: 4,869,306
[45] Date of Patent: Sep. 26, 1989

[54] AIR INLET AND AUTOMATIC PRESSURE ADJUSTMENT DEVICE FOR A TIRE

[76] Inventor: Kenneth B. Keys, Rte. 13, Box 9502, Leander, Tex. 78641

[21] Appl. No.: 162,031

[22] Filed: Feb. 29, 1988

Related U.S. Application Data

[63] Continuation-in-part of Ser. No. 128,909, Dec. 4, 1987.

[51] Int. Cl.$^4$ .................. B60C 29/00; B60C 23/00
[52] U.S. Cl. ............................ 152/427; 141/38; 152/428; 152/429
[58] Field of Search ............... 152/415, 431, 427–429; 137/224, 226, 228, 230, 543.18; 141/38, 302

[56] References Cited

U.S. PATENT DOCUMENTS

| | | | |
|---|---|---|---|
| 2,306,495 | 12/1942 | Payne | 137/226 |
| 2,323,237 | 6/1943 | Payne | 137/226 |
| 3,631,886 | 1/1972 | Helden | 137/226 X |
| 3,693,691 | 9/1972 | Summers | 152/427 |
| 4,456,038 | 1/1984 | Gwaltney et al. | 152/415 X |
| 4,658,869 | 4/1987 | Soon-Fu | 152/415 X |

*Primary Examiner*—Michael W. Ball
*Assistant Examiner*—Thomas Bokan
*Attorney, Agent, or Firm*—Joseph F. Long

[57] ABSTRACT

An air inlet and automatic pressure adjustment assembly comprising a smaller closed ended inner cylinder with a partially common wall with a larger outer cylinder with there being a vent hole in the common cylinder wall and an adjustable spring loaded to close vent valve in the inner cylinder so that excess air pressure opens this valve to vent air from the tire to the outside. The layer outer cylinder contains a normal air inlet valve that will be held closed by inlet air pressure of the tire.

9 Claims, 2 Drawing Sheets

SECTION A-A

AIR INLET AND AUTOMATIC PRESSURE ADJUSTMENT DEVICE FOR A TIRE

This is a continuation-in-part of my patent Ser. No. 07/128,909 filed 12/04/87 entitled "Air Inlet and Automatic Pressure Adjustment Device for a Tire."

This invention pertains to a dual valve assembly to fit on the normal valve stem of a tire or to replace a normal valve stem. In this continuation-in-part, a dual assembly has one vent valve that is normally factory preset to open at the desired tire pressure and to vent air at this preset pressure so that the tire may not be over pressured while filling. A second valve is spring loaded to close and is opened by the air hose filling nozzle and tends to be held closed by the pressure in the tire.

The assembly may be visualized as a smaller cylinder formed inside a larger cylinder with the upper end of the smaller cylinder closed with a slotted threaded plug and with a portion of the wall common with the larger cylinder. This smaller cylinder contains the spring loaded vent valve that seats against a resilient seat with the spring tension being adjustable by adjusting the position of the threaded seat containing the resilient gasket or slotted threaded plug. The threaded smaller cylinder is internal to the larger cylinder and the spring tension or internal pressure necessary to lift the seat may be factory preset before final assembly, but can also be adjusted by the threaded plug in the end of the cylinder. The wall that is common to both the larger and smaller cylinder contains a vent hole. Thus, when tire internal pressure exceeds the spring setting of the vent valve internal air vents to the atmosphere. The larger cylinder is fitted with internal threads and a spring loaded valve may be threaded into these internal threads with the spring held between the closed end of the inner cylinder containing the vent valve and the inlet valve so that the spring biases closed this inlet valve. The inlet valve assembly is externally threaded so that a cap may be screwed on this to keep the inlet valve free of dirt or dust. The inlet valve may be removed and the inner spring loaded valve may be adjusted with a screw driver by adjusting the slotted threaded cylinder plug.

There are three embodiments of this improvement. In a first embodiment, the dual valve assembly is made to go directly into a tire rim in the usual manner.

In a second embodiment, the dual valve assembly threads on to the normal valve stem after the internal valve in the normal valve stem has been removed. In a third embodiment, an internal collar with a spring-like depressor depresses the internal valve of the valve stem on the tire when this pressure adjusting assembly is screwed onto the valve stem.

We have considered the following patents in this field:

| | | |
|---|---|---|
| 1. Ser. No. 3,631,886 | Paul Herden 1972 | |
| 2. Ser. No. 4,456,038 | Robert Gwaltney and Jim L. Holladay 1985 | |
| 3. Ser. No. 3,918,482 | William Sylvester Stroh 1974 | |
| 4. Ser. No. 3,693,691 | Stanley E. Summers 1972 | |

Unique features of this invention include:

1. An assembly that may be screwed on a normal in-use valve stem and thereafter, prevents over pressure and relieves pressure down to a desired level.
2. An assembly that may be adjusted to allow inflating to a desired pressure.
3. A small lightweight assembly for air inlet and pressure adjustment.
4. An inlet air and pressure adjustment assembly that is small enough to replace a normal valve stem using the same mounting structure.

Obviously, minor changes could be made in the invention without changing the purpose and function, so we do not wish to be limited to exact details, but only as to spirit and purpose and general design as outlined in these claims and specifications.

BRIEF DESCRIPTION OF THE INVENTION

In all three embodiments, a valve assembly containing dual valves to allow filling the tire, to adjust final pressure in the tire and to prevent filling the tire markedly over the final desired pressure are used.

A first embodiment of this dual valve assembly comprises

1. A fitting to connect the assembly to a tire rim.
2. A smaller closed ended cylinder closed with a slotted threaded cap and inside a larger cylinder with the smaller closed ended cylinder and the larger cylinder having a common wall with the common wall containing a vent hole.
3. A spring loaded valve inside the smaller closed ended cylinder with a threaded valve seat so that the seat may be positioned to adjust the pressure that will cause the valve to open by further compressing the spring. This adjustment would be made at the factory before final assembly.

The spring tension or internal pressure may also be adjusted by removing the threaded inlet valve and using a screw driver to position the slotted threaded cap closing the end of the smaller closed ended cylinder.

4. The larger cylinder, which is equipped with a fitting to connect into a tire, contains a threaded inlet valve that may be opened by the usual inlet air nozzle and is biased closed by a spring between the inlet valve and the closed top portion of the smaller inner closed ended cylinder containing the pressure adjustment valve. The internally threaded inlet valve has external threading to be closed with a cap to keep dirt or dust out of the assembly.

DETAILED DESCRIPTION OF THE DRAWINGS

Figure 1:
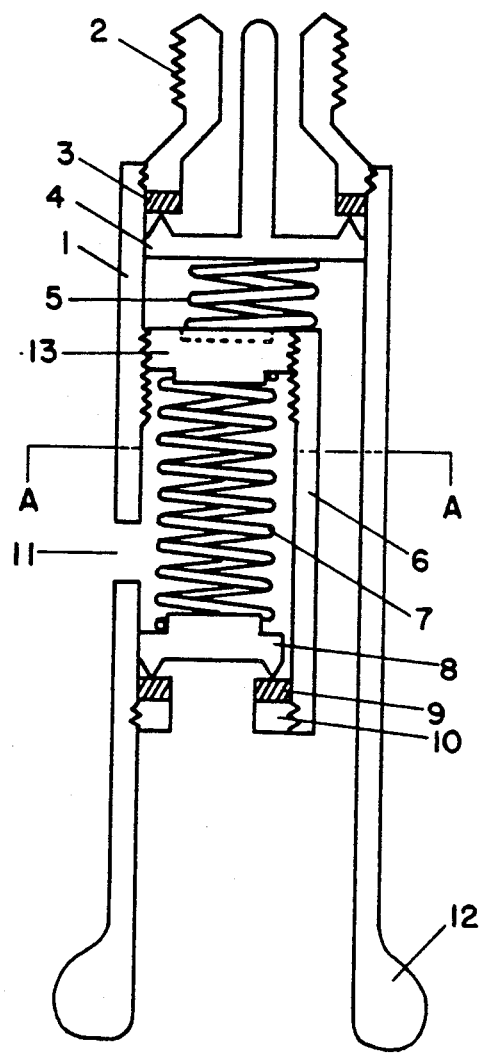
FIG. 1 shows a cut-a-way view of a first embodiment of the dual valve assembly with the outer cylinder equipped to fasten into a tire rim.

In FIG. 1, we have shown a first embodiment designed to be put into the rim as new equipment or as replacement for the normal valve stem. The unit main body 1 is cylindrical in shape; is threaded to receive the inlet valve body 2; with valve 4 shown against seat 3 (which may be an elastomeric gasket such as Neoprene). This valve 4 is biased closed by the spring 5. The spring 5 seats on the closed end of inner cylinder 6 and against valve 4. Inner cylinder 6 is closed with a threaded slotted cap 13 and contains a spring 7 which biases valve 8 against an elastomeric seat 9 contained in the threaded pressure adjustment collar 10. The common wall of cylinder 1 and cylinder 6 contains a vent hole 11. The spring 7 is of proper size so that the threaded pressure adjustment collar 10 or the slotted threaded cap 13 may be used to adjust the pressure necessary to lift valve 8 so that air inside the tire will vent down to preset pressure through opening 11 When during filling the pressure in the tire exceeds the preset pressure to lift valve 8, the air then vents thus preventing over pressure and providing internal pressure adjustment to the preset pressure. The resilient connector 12 serves to mount the unit in a rim that holds a tire.

Figure 2:
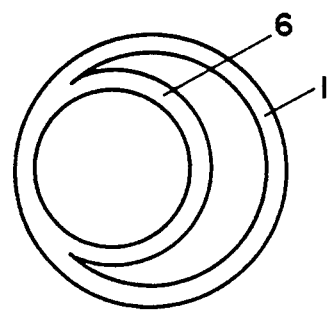
FIG. 2 shows a top view of a section A—A of FIG. 1 indicating a common wall between the smaller internal closed ended cylinder and the larger external cylinder.

FIG. 2 is a top view of section A—A of FIG. 1 showing the common wall portion of cylinder 1 and cylinder 6.

Figure 3:
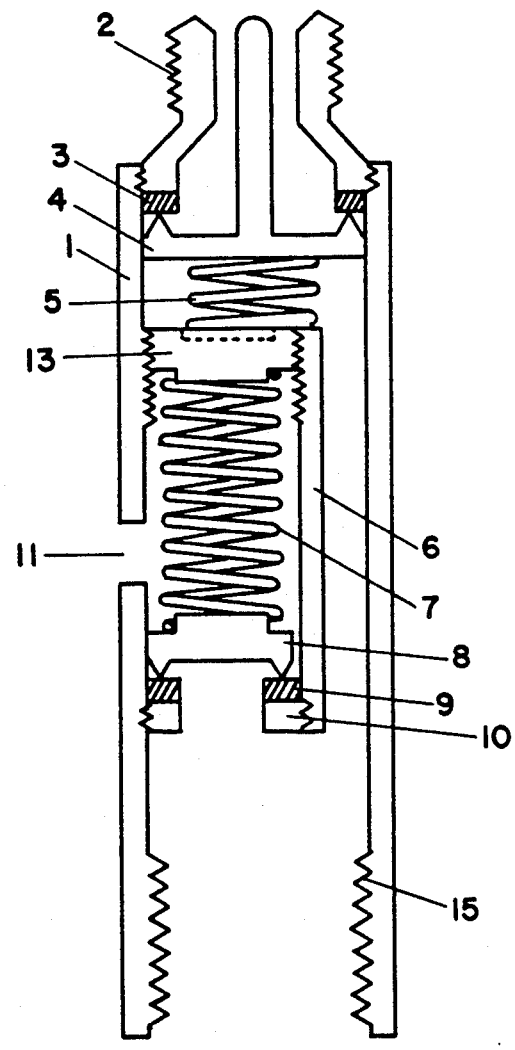
FIG. 3 shows a second embodiment having the same structure as FIG. 1 but with external cylinder sized and internally threaded on the exit end in order to allow threading the assembly on a valve stem. When this embodiment is used, the valve core normally internal to the tire valve stem must be removed.

FIG. 3 shows an embodiment of the invention designed to be threaded on an existing valve stem after the valve core in the existing stem has been removed. The parts of the embodiment shown in FIG. 3 are the same as in FIG. 1 with the exception that fitting 12 from FIG. 1 has been replaced with a threaded section 15 that will thread to a normal valve stem. The body of the unit would be shorter than the body or cylinder 1 of FIG. 1.

Figure 4:
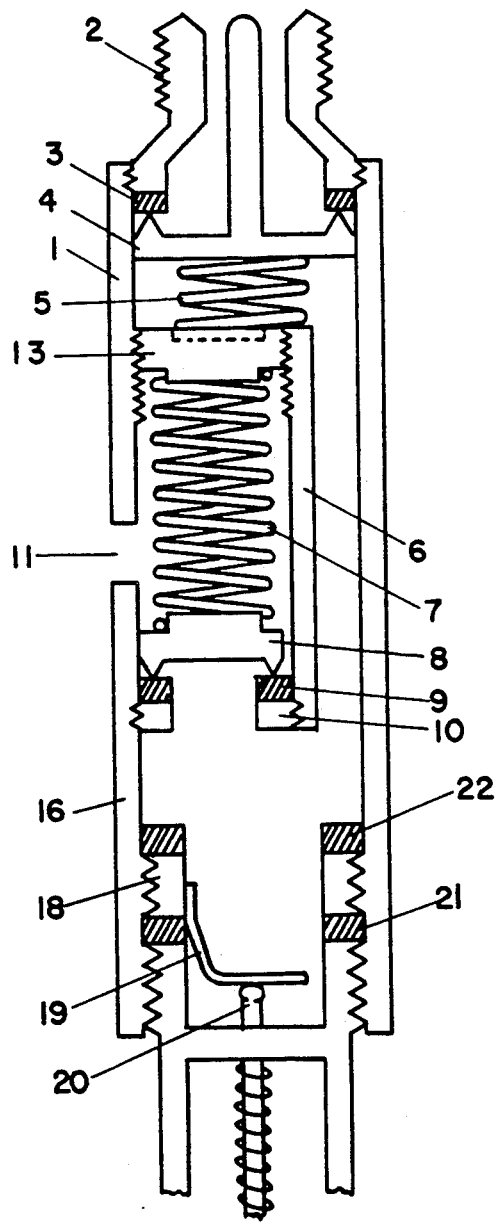
FIG. 4 shows a third embodiment similar to the second embodiment in FIG. 3, but with external cylinder containing a threaded internal collar with a spring-like projection that may be so positioned as to hold the valve normally in a valve stem on a tire in the open position as long as this assembly is threaded onto the valve stem.

FIG. 4 shows a third embodiment quite similar to FIG. 3, but with a threaded collar 18 equipped with a spring type depressor 19 and seating against gaskets 22 and 21 and so adjusted that when the assembly is threaded onto a normal valve stem that the valve 20 in the normal valve stem is held in the open position by the spring type depressor 19.

We claim:

1. An inlet air and automatic pressure adjustment assembly comprising:
   (a) a first cylinder with a threaded inlet end and means to connect to a tire on the exit end
   (b) a closed ended second cylinder smaller in diameter and internal to said first cylinder with a portion of a wall common to both said first cylinder and said closed ended second cylinder with said portion of a wall containing a vent hole
   (c) an inlet valve in said threaded inlet end of said first cylinder with a spring between said closed ended second cylinder and said inlet valve
   (d) a vent valve seating against a threaded adjustable seat and spring loaded to close with a spring internal to said closed ended second cylinder; said vent valve communicating with air inside said first cylinder and thereby with air inside said tire and opening to release air when air pressure within said tire exceeds force of said spring internal to said closed ended second cylinder tending to close said vent valve.

2. An inlet air and automatic pressure adjustment assembly as in claim 1 where said exit end of said first cylinder is equipped to fasten into a tire rim.

3. An inlet air automatic pressure adjustment assembly as in claim 1 wherein an exit end of said first cylinder is internally threaded both to contain a collar with means to open the valve in a valve stem without blocking air flow and to thread onto a valve stem.

4. An inlet air and automatic pressure adjustment assembly as in claim 1, where said closed ended second cylinder is closed with a slotted threaded cap that may be used to adjust compression of said internal spring.

5. An inlet air and automatic pressure adjustment assembly as in claim 1 wherein said inlet valve is formed with a circular triangular ribbed section that closed against an elastomeric gasket.

6. An inlet air and automatic pressure adjustment assembly as in claim 1 where in said vent valve is formed with a circular triangular ribbed section that closes against an elastomeric gasket.

7. An inlet air and automatic pressure adjustment assembly comprising
   (a) an inner cylinder closed on one end with a slotted threaded cap and with the other end communicating with air inside a larger cylinder and containing a vent valve which is spring loaded to close against a threaded adjustable valve seat with a spring internally contained in said inner cylinder thereby closing said inner cylinder until air pressure inside said larger cylinder is sufficient to open said vent valve; said inner cylinder being integrally formed with said larger cylinder with a portion of said inner cylinder wall and said larger cylinder being common to both said inner cylinder and said larger cylinder and said portion containing a vent hole
   (b) an air inlet valve which is spring loaded to close against a threaded seat in a inlet end of said larger cylinder with a spring contained between said air inlet valve and said slotted threaded cap of said inner cylinder and with said inlet valve capable of being depressed to open by a service station air hose nozzle and
   (c) means to connect said larger cylinder outlet end to communicate with internal air in a tire wherein said slotted threaded cap allows for adjusting of compression of said spring internally contained in said inner cylinder.

8. An inlet air and automatic pressure adjustment assembly as in claim 7, where said means to connect said larger cylinder outlet end to communicate with air in a tire is resilient connector that snaps into a hole in said tire rim.

9. An inlet air and automatic pressure adjustment assembly as in claim 7, where said means to connect said larger cylinder outlet end to communicate with air in a tire is a threaded outlet end that contains means to depress-to-open a valve normally present in a valve stem of said tire when said assembly is threaded on said valve stem.

* * * * *